United States Patent

Matsuo

(10) Patent No.: US 9,753,246 B2
(45) Date of Patent: Sep. 5, 2017

(54) EYEPIECE OPTICAL SYSTEM, OPTICAL APPARATUS AND METHOD FOR MANUFACTURING THE EYEPIECE OPTICAL SYSTEM

(71) Applicant: Nikon Corporation, Chiyoda-ku, Tokyo (JP)

(72) Inventor: Taku Matsuo, Kawasaki (JP)

(73) Assignee: Nikon Corporation, Tokyo (JP)

( * ) Notice: Subject to any disclaimer, the term of this patent is extended or adjusted under 35 U.S.C. 154(b) by 13 days.

(21) Appl. No.: 14/675,790

(22) Filed: Apr. 1, 2015

(65) Prior Publication Data

US 2015/0212289 A1 Jul. 30, 2015

Related U.S. Application Data

(63) Continuation of application No. PCT/JP2013/005927, filed on Oct. 4, 2013.

(30) Foreign Application Priority Data

Oct. 4, 2012 (JP) .................. 2012-222535
Oct. 4, 2012 (JP) .................. 2012-222536

(51) Int. Cl.
*G02B 9/16* (2006.01)
*G02B 25/00* (2006.01)
*G03B 13/00* (2006.01)
*H04N 5/225* (2006.01)
*H04N 5/232* (2006.01)
*G02B 9/34* (2006.01)
*G02B 13/18* (2006.01)
(Continued)

(52) U.S. Cl.
CPC ............... *G02B 9/16* (2013.01); *G02B 9/34* (2013.01); *G02B 13/0035* (2013.01);
(Continued)

(58) Field of Classification Search
CPC ........ G02B 9/16; G02B 9/34; G02B 13/0035; G02B 25/001; G02B 13/18; G02B 9/14;
(Continued)

(56) References Cited

U.S. PATENT DOCUMENTS 5,305,147 A 4/1994 Hasegawa et al.
6,011,655 A 1/2000 Kanai
(Continued)

FOREIGN PATENT DOCUMENTS

CN 102654640 A 9/2012
JP 60-057315 A 4/1985
(Continued)

OTHER PUBLICATIONS

International Search Report from International Patent Application No. PCT/JP2013/005927, Dec. 3, 2013.

*Primary Examiner* — Jason Flohre
(74) *Attorney, Agent, or Firm* — Shapiro, Gabor and Rosenberger, PLLC

(57) ABSTRACT

Provided is an eyepiece optical system including, in order from an observation object (Ob): a first lens (L11) having positive refractive power; a second lens (L12) which has negative refractive power and of which an observation object (Ob) side lens surface is concave; and a third lens (L13) which has positive refractive power and of which an eye point (EP) side lens surface is convex. The third lens (L13) is fixed on the optical axis with respect to the observation object (Ob) when adjusting the diopter, and the following conditional expressions are satisfied:

$0.65 < R31/fe < 1.30$ (1)

$-0.80 < (R32+R31)/(R32-R31) < -0.10$ (2)

where fe denotes a focal length of the eyepiece optical system, R31 denotes a radius of curvature of the observation object (Ob) side lens surface of the third lens (L13), and R32 denotes a radius of curvature of the eye point (EP) side lens surface of the third lens (L13).

19 Claims, 11 Drawing Sheets

(EXAMPLE 1)

(51) Int. Cl.
*G03B 13/06* (2006.01)
*G02B 13/00* (2006.01)

(52) U.S. Cl.
CPC ........... *G02B 25/001* (2013.01); *G03B 13/06* (2013.01); *H04N 5/2254* (2013.01); *H04N 5/23216* (2013.01); *G02B 13/18* (2013.01); *Y10T 29/49826* (2015.01)

(58) Field of Classification Search
CPC .. H04N 5/23216; H04N 5/2254; G03B 13/06; Y10T 29/49826
See application file for complete search history.

(56) References Cited

U.S. PATENT DOCUMENTS 6,253,033 B1  6/2001  Hasushita
2003/0156834 A1*  8/2003  Ogata ................... G03B 13/02
                                                    396/373
2010/0290129 A1* 11/2010  Nishio ................ G02B 25/001
                                                    359/645
2012/0099206 A1*  4/2012  Kubota ................ G02B 25/001
                                                    359/645
2012/0224271 A1   9/2012  Matsuo

FOREIGN PATENT DOCUMENTS

| | | |
|---|---|---|
| JP | 04-100011 A | 4/1992 |
| JP | 08-254660 A | 10/1996 |
| JP | 2000-111812 A | 4/2000 |
| JP | 2002-048985 A | 2/2002 |
| JP | 2003-149562 A | 5/2003 |
| JP | 2003-149563 A | 5/2003 |
| JP | 2012-093478 A | 5/2012 |
| JP | 2012-181322 A | 9/2012 |
| JP | 2012-194541 A | 10/2012 |

* cited by examiner (EXAMPLE 4)

EYEPIECE OPTICAL SYSTEM, OPTICAL APPARATUS AND METHOD FOR MANUFACTURING THE EYEPIECE OPTICAL SYSTEM

This is a continuation of PCT International Application No. PCT/JP2013/005927, filed on Oct. 4, 2013, which is hereby incorporated by reference. This application also claims the benefit of Japanese Patent Application Nos. 2012-222535 and 2012-222536, filed in Japan on Oct. 4, 2012, which are hereby incorporated by reference.

TECHNICAL FIELD

The present invention relates to an eyepiece optical system for observing an image displayed on an image display element, which is suitable for an electronic view finder (EVF).

TECHNICAL BACKGROUND

An eyepiece optical system, which allows to observe an image displayed on a small image display element with high magnification, has been proposed (e.g. see Patent Document 1).

PRIOR ART LIST

Patent Document

Patent Document 1: Japanese Laid-Open Patent Publication No. 2002-48985 (A)

SUMMARY OF THE INVENTION

Problems to be Solved by the Invention

However a conventional eyepiece optical system cannot sufficiently satisfy aberration correction, in particular the correction of coma aberration and distortion.

With the foregoing in view, it is an object of the present invention to provide: an eyepiece optical system in which various aberrations, in particular coma aberration and distortion are satisfactorily corrected; an optical apparatus including this eyepiece optical system; and a method for manufacturing the eyepiece optical system.

Means to Solve the Problems

To achieve this object, an eyepiece optical system according to a first aspect of the present invention includes, in order from an observation object: a first lens having positive refractive power; a second lens which has negative refractive power and of which an observation object side lens surface is concave; and a third lens which has positive refractive power and of which an eye point side lens surface is convex, the third lens is fixed on an optical axis with respect to the observation object when adjusting a diopter, and the following conditional expressions are satisfied.

$$0.65 < R31/fe < 1.30$$

$$-0.80 < (R32+R31)/(R32-R31) < -0.10$$

where fe denotes a focal length of the eyepiece optical system, R31 denotes a radius of curvature of an observation object side lens surface of the third lens, and R32 denotes a radius of curvature of the eye point side lens surface of the third lens.

In the eyepiece optical system according to the first aspect of the present invention, it is preferable that the observation object is an image display element.

In the eyepiece optical system according to the first aspect of the present invention, it is preferable that the image display element is a liquid crystal display element.

In the eyepiece optical system according to the first aspect of the present invention, it is preferable that the following conditional expression is satisfied.

$$1.00 < fe/f3 < 2.00$$

where fe denotes a focal length of the eyepiece optical system, and f3 denotes a focal length of the third lens.

In the eyepiece optical system according to the first aspect of the present invention, it is preferable that the following conditional expression is satisfied.

$$0.60 < fe/f1 < 2.00$$

where fe denotes a focal length of the eyepiece optical system, and f1 denotes a focal length of the first lens.

In the eyepiece optical system according to the first aspect of the present invention, it is preferable that the following conditional expression is satisfied.

$$0.40 < f3/f1 < 2.50$$

where f1 denotes a focal length of the first lens, and f3 denotes a focal length of the third lens.

In the eyepiece optical system according to the first aspect of the present invention, it is preferable that the following conditional expression is satisfied.

$$-2.00 < (R12+R11)/(R12-R11) < -0.75$$

where R11 denotes a radius of curvature of an observation object side lens surface of the first lens, and R12 denotes a radius of curvature of an eye point side lens surface of the first lens.

In the eyepiece optical system according to the first aspect of the present invention, it is preferable that the following conditional expression is satisfied.

$$1.35 < (R22+R21)/(R22-R21) < 2.40$$

where R21 denotes a radius of curvature of the observation object side lens surface of the second lens, and R22 denotes a radius of curvature of an eye point side lens surface of the second lens.

In the eyepiece optical system according to the first aspect of the present invention, it is preferable that the following conditional expression is satisfied.

$$1.60 < fe/(-f2) < 2.20$$

where fe denotes a focal length of the eye piece optical system, and f2 denotes a focal length of the second lens.

In the eyepiece optical system according to the first aspect of the present invention, it is preferable that the first lens, the second lens and the third lens are all made of plastic.

In the eyepiece optical system according to the first aspect of the present invention, it is preferable that the observation object side lens surface of the second lens is aspherical.

In the eyepiece optical system according to the first aspect of the present invention, it is preferable that the eye point side lens surface of the third lens is aspherical.

In the eyepiece optical system according to the first aspect of the present invention, it is preferable that the diopter is adjusted by moving the first lens and the second lens along the optical axis.

An optical apparatus according to the present invention includes: an objective lens; a picture element that captures an image formed by the objective lens; an image display element that displays the image captured by the picture element; and an eyepiece optical system for observing the image displayed on the image display element, and the eyepiece optical system is any of the eyepiece optical system according to the first aspect.

An eyepiece optical system according to a second aspect of the present invention includes: a first lens having positive refractive power; a second lens which has negative refractive power and of which an observation object side lens surface is concave; and a third lens which has positive refractive power and of which an eye point side lens surface is convex, at least one lens surface, out of lens surfaces constituting the first lens, the second lens and the third lens, is aspherical, and the following conditional expressions are satisfied.

$$0.40 < f3/f1 < 2.50$$

$$-2.00 < (R12+R11)/(R12-R11) < -0.75$$

$$1.35 < (R22+R21)/(R22-R21) < 2.40$$

where f1 denotes a focal length of the first lens, f3 denotes a focal length of the third lens, R11 denotes a radius of curvature of an observation object side lens surface of the first lens, R12 denotes a radius of curvature of an eye point side lens surface of the first lens, R21 denotes a radius of curvature of the observation object side lens surface of the second lens, and R22 denotes a radius of curvature of an eye point side lens surface of the second lens.

In the eyepiece optical system according to the second aspect of the present invention, it is preferable that the following conditional expression is satisfied.

$$1.60 < fe/(-f2) < 2.20$$

where fe denotes a focal length of the eyepiece optical system, and f2 denotes a focal length of the second lens.

In the eyepiece optical system according to the second aspect of the present invention, it is preferable that the following conditional expression is satisfied.

$$0.60 < fe/f1 < 2.00$$

where fe denotes a focal length of the eyepiece optical system.

An optical apparatus according to the present invention includes: an objective lens; a picture element that captures an image formed by the objective lens; an image display element that displays the image captured by the picture element; and an eyepiece optical system for observing the image displayed on the image display element, and the eyepiece optical system is any of the eyepiece optical system according to the second aspect.

A method for manufacturing an eyepiece optical system according to the present invention is a method for manufacturing an eyepiece optical system including, in order from an observation object side: a first lens having positive refractive power; a second lens which has negative refractive power and of which an observation object side lens surface is concave; and a third lens which has positive refractive power and of which an eye point side lens surface is convex, the method including: fixing the third lens on an optical axis with respect to the observation object when adjusting a diopter; and disposing each lens in a lens barrel so as to satisfy the following conditional expression.

$$0.65 < R31/fe < 1.30$$

$$-0.80 < (R32+R31)/(R32-R31) < -0.10$$

where fe denotes a focal length of the eyepiece optical system, R31 denotes a radius of curvature of an observation object side lens surface of the third lens, and R32 denotes a radius of curvature of the eye point side lens surface of the third lens.

A method for manufacturing an eyepiece optical system according to the present invention is also a method for manufacturing an eyepiece optical system including, in order from an observation object side along an optical axis, a first lens having positive refractive power; a second lens which has negative refractive power and of which an observation object side lens surface is concave; and a third lens which has positive refractive power and of which an eye point side lens surface is convex, at least one lens surface, out of lens surfaces constituting the first lens, the second lens and the third lens, being aspherical, the method including disposing each lens in a lens barrel so as to satisfy the following conditional expression.

$$0.40 < f3/f1 < 2.50$$

$$-2.00 < (R12+R11)/(R12-R11) < -0.75$$

$$1.35 < (R22+R21)/(R22-R21) < 2.40$$

where f1 denotes a focal length of the first lens, f3 denotes a focal length of the third lens, R11 denotes a radius of curvature of an observation object side lens surface of the first lens, R12 denotes a radius of curvature of an eye point side lens surface of the first lens, R21 denotes a radius of curvature of the observation object side lens surface of the second lens, and R22 denotes a radius of curvature of an eye point side lens surface of the second lens.

Advantageous Effects of the Invention

According to the present invention, an eyepiece optical system in which various aberrations, in particular coma aberration and distortion are satisfactorily corrected, an optical apparatus including this eyepiece optical system, and a method for manufacturing the eyepiece optical system can be provided.

DESCRIPTION OF THE EMBODIMENTS

Embodiments of the present invention will be described with reference to the drawings. First, Embodiment 1 of the invention will be described with reference to FIG. 1 to FIG. 7. Then Embodiment 2 of the present invention will be described with reference to FIG. 8 to FIG. 10. Finally an optical apparatus according to these embodiments will be described with reference to FIG. 11.

It is an object of the present invention to implement an eyepiece optical system in which aberrations are satisfactorily corrected while achieving miniaturization securing an apparent angle of field not less than 25°. In particular, it is an object of the present invention to correct coma aberration and distortion satisfactorily.

If an eyepiece optical system having high magnification with an apparent angle of field not less than 25° is implemented to magnify and observe a small image display element (e.g. width across corner is about 12 mm), correction of coma aberration and distortion becomes especially difficult. In particular, coma aberration of a peripheral angle of view seriously worsens, and resolution in the peripheral field of view drops. Further, in order to secure high magnification, strong positive refractive power is required for the eyepiece optical system, which tends to generate positive distortion and deform the observation field of view into a pin cushion shape, causing discomfort to the observer.

In the embodiments, it is preferable that the image display element is a liquid crystal display element. A liquid crystal display element displays an image using the polarizing characteristic of liquid crystal, hence the range in which good display luminous flux can be acquired is narrow. Generally this range is regarded to be ±10° from the direction perpendicular to the display surface, and light attenuation and change of tone are generated outside this range. This means that an eyepiece optical system, to observe a liquid crystal display element, requires some telecentricity. However a lens system larger than the image display element must be disposed to secure telecentricity, which makes miniaturization difficult.

Therefore the eyepiece optical systems according to the embodiments are configured as shown in each example, which is described below, in order to secure telecentricity while minimizing the outer dimensions, whereby the above mentioned problems are solved.

Embodiment 1

Figure 1:
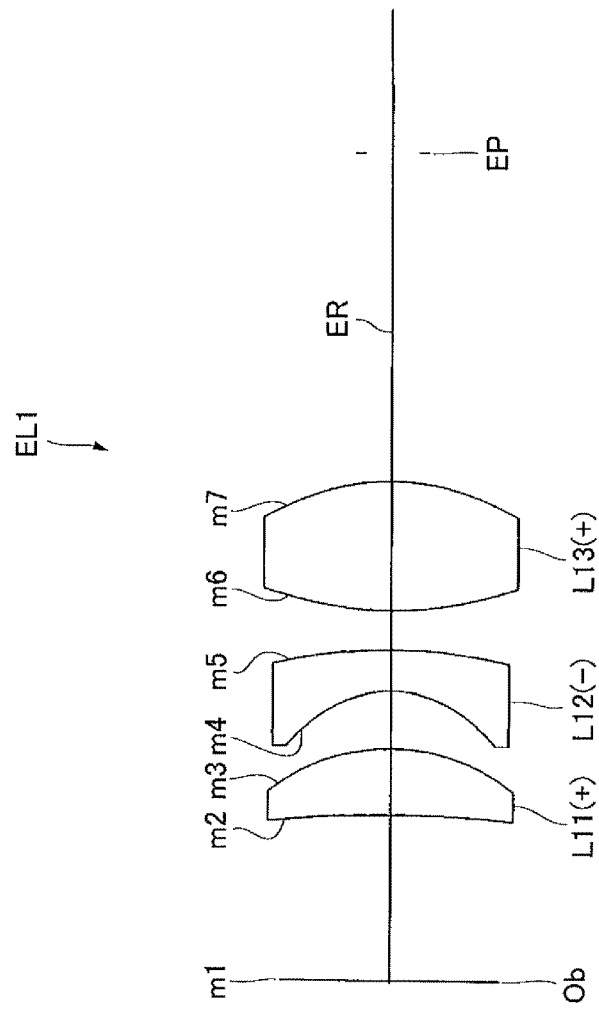
FIG. 1 is a diagram depicting a configuration of an eyepiece optical system according to Example 1.

As shown in FIG. 1, in an eyepiece optical system according to Embodiment 1, a first lens L11 having positive refractive power is disposed near an observation object (image display element) Ob, a second lens L12, which has negative refractive power and of which observation object Ob side lens surface is concave, is disposed to correct spherical aberration and curvature of field generated in the first lens L11, and a third lens L13, which has positive refractive power and of which eye point EP side lens surface is convex, is disposed to correct coma aberration and distortion. By satisfying the later mentioned conditional expressions (1) and (2) in this configuration, the above mentioned problems are solved.

In Embodiment 1, the second lens L12 is constituted by one single lens, but the same effect can be implemented even if the second lens L12 is constituted by two lenses.

In Embodiment 1, the third lens L13 is fixed on the optical axis with respect to the observation object Ob when adjusting the diopter. Conventionally in this type of eyepiece optical system, a fixed protective window (plane plate glass) is disposed in a position closest to the eye point, in order to protect the optical system and enhance the dust proof performance. However in the eyepiece optical system having the above configuration according to Embodiment 1, the total length of the optical system can be decreased since the protective window is not included, and a sufficient dust proof performance can be implemented even without the protective window. Furthermore, ghosts, generated when light is reflected by the protective window and returns to the display panel (display surface), can be minimized.

In this configuration, the eyepiece optical system according to Embodiment 1 satisfies the following conditional expressions (1) and (2).

$$0.65 < R31/fe < 1.30 \quad (1)$$

$$-0.80 < (R32+R31)/(R32-R31) < -0.10 \quad (2)$$

where fe denotes a focal length of the eyepiece optical system, R31 denotes a radius of curvature of the observation object Ob side lens surface of the third lens L13, and R32 denotes a radius of curvature of the eye point side EP lens surface of the third lens L13.

The conditional expression (1) specifies a ratio of the focal length of the eyepiece optical system with respect to the radius of curvature of the observation object Ob side lens surface of the third lens L13, in order to minimize ghosts generated on the observation object Ob side lens surface in the third lens L13, while maintaining good aberration correctability.

If the lower limit value of the conditional expression (1) is not reached, the radius of curvature of the observation object Ob side lens surface of the third lens L13 becomes too small, whereby positive distortion increases. Furthermore, field tilt toward the positive diopter side is generated.

If the upper limit value of the conditional expression (1) is exceeded, the radius of curvature of the observation object Ob side lens surface of the third lens L13 increases, and the light reflected by the observation object Ob side lens surface of the third lens L13 is collected to an area near the display panel (display surface) and becomes a ghost, which diminishes the appearance of the image considerably. Furthermore, curvature of field worsens.

To demonstrate the above mentioned effect with certainty, it is preferable that the lower limit value of the conditional expression (1) is 0.70. To demonstrate the above mentioned effect with certainty, it is preferable that the upper limit value of the conditional expression (1) is 1.00.

The conditional expression (2) specifies the shape of the third lens L13. If the conditional expression (2) is satisfied, appropriate magnification and eye relief ER can be implemented, and coma aberration and curvature of field can be corrected satisfactorily, even if a strong convex surface is disposed on the eye point EP side of the third lens L13 and the total length of the optical system is decreased. Here the eye relief ER refers to a distance on the optical axis from the lens surface closest to the observation eye of the eyepiece optical system to the eye point EP.

If the lower limit value of the conditional expression (2) is not reached, light having a large angle of view enters the lens surface at a large angle, and major coma aberration and curvature of field are generated, and correction thereof becomes difficult.

If the upper limit value of the conditional expression (2) is exceeded, the principal point position moves closer to the observation object Ob, which increases the size of the optical system as a whole, and is not desirable. If the total length of the optical system is maintained, the focal length decreases, and securing the eye relief ER becomes difficult. Moreover, correction of distortion becomes insufficient, which is not desirable.

To demonstrate the above mentioned effect with certainty, it is preferable that the lower limit value of the conditional expression (2) is −0.40. To demonstrate the above mentioned effect with certainty, it is preferable that the upper limit value of the conditional expression (2) is −0.15.

In the eyepiece optical system according to Embodiment 1, it is preferable that the following conditional expression (3) is satisfied.

$$1.00 < fe/f3 < 2.00 \qquad (3)$$

where fe denotes a focal length of the eyepiece optical system, and f3 denotes a focal length of the third lens L13.

Conditional expression (3) specifies a ratio of the focal length of the third lens L13 with respect to the focal length of the total optical system. If the conditional expression (3) is satisfied, various aberrations, including coma aberration and distortion, can be corrected satisfactorily, even if the focal length of the total optical system is decreased to implement high magnification.

If the lower limit value of the conditional expression (3) is not reached, it becomes difficult to sufficiently correct coma aberration and distortion generated in the second lens L12. Moreover, the size of the total length of the optical system increases.

If the upper limit value of the conditional expression (3) is exceeded, the power of the third lens L13 becomes too strong and positive distortion remains. Moreover, it becomes difficult to secure sufficient eye relief ER. If the eye relief ER is secured, the size of the third lens L13 must be increased considerably.

To demonstrate the above mentioned effect with certainty, it is preferable that the lower limit value of the conditional expression (3) is 1.20. To demonstrate the above mentioned effect with certainty, it is preferable that the upper limit value of the conditional expression (3) is 1.60.

In the eyepiece optical system according to Embodiment 1, it is preferable that the following conditional expression (4) is satisfied.

$$0.60 < fe/f1 < 2.00 \qquad (4)$$

where fe denotes a focal length of the eyepiece optical system, and f2 denotes a focal length of the first lens L11.

The conditional expression (4) specifies a ratio of the focal length of the first lens L11 with respect to the focal length of the total optical system.

If the lower limit value of the conditional expression (4) is not reached, it becomes difficult to implement telecentricity, and appearance when the eye is slightly shifted on the eye point EP drops considerably. Moreover, the third lens L13 becomes large. Furthermore distortion worsens.

If the upper limit value of the conditional expression (4) is exceeded, correction of aberration (e.g. distortion) becomes difficult in the second lens L12. Moreover, the height of incident light to the third lens L13 becomes low, which makes it difficult to implement sufficient magnification and eye relief ER.

To demonstrate the above mentioned effect with certainty, it is preferable that the lower limit value of the conditional expression (4) is 1.00. To demonstrate the above mentioned effect with certainty, it is preferable that the upper limit value of the conditional expression (4) is 1.20.

In the eyepiece optical system according to Embodiment 1, it is preferable that the following conditional expression (5) is satisfied.

$$0.40 < f3/f1 < 2.50 \qquad (5)$$

where f1 denotes a focal length of the first lens L11, and f3 denotes a focal length of the third lens L13.

The conditional expression (5) specifies a ratio of the focal length of the third lens L13 with respect to the focal length of the first lens L11 in order to satisfactorily correct distortion and coma aberration, which worsen as the positive refractive power of the first lens L11 and the third lens L13 become stronger due to the increase in magnification of the eyepiece optical system. In concrete terms, the conditional expression (5) specifies the condition to balance the first lens L11 and the third lens L13, so that considerable distortion, generated in the first lens L11, is excessively corrected by the second lens L12, and this excessive correction by the second lens L12 is further corrected using distortion generated in the third lens L13.

If the lower limit value of the conditional expression (5) is not reached, the correction of distortion in the second lens L12 becomes excessive, and negative distortion is generated, which deforms the observation field of view to a barrel shape. Moreover, coma aberration generated in the second lens L12 becomes too high, which makes it difficult to correct in the third lens L13.

If the upper limit value of the conditional expression (5) is exceeded, the correction amount in the second lens L12 becomes insufficient, and it becomes difficult to correct distortion generated in the third lens L13, and as a result, positive distortion remains. Moreover, field tilt is generated on the positive diopter side because of the strong positive refractive power of the third lens L13.

To demonstrate the above mentioned effect with certainty, it is preferable that the lower limit value of the conditional expression (5) is 0.60. To demonstrate the above mentioned effect with certainty, it is preferable that the upper limit value of the conditional expression (5) is 1.20.

In the eyepiece optical system according to Embodiment 1, it is preferable that the following conditional expression (6) is satisfied.

$$-2.00 < (R12+R11)/(R12-R11) < -0.75 \qquad (6)$$

where R11 denotes a radius of curvature of the observation object Ob side lens surface of the first lens L11, and R12 denotes a radius of curvature of the eye point EP side lens surface of the first lens L11.

The conditional expression (6) specifies the shape of the first lens L11 to satisfactorily correct distortion and curvature of field, which worsens as the positive refractive power of the first lens L11 becomes stronger due to the increase in magnification of the optical system.

If the lower limit value of the conditional expression (6) is not reached, the eye point EP side lens surface of the first lens L11 has an even stronger positive refractive power, which generates major distortion in a pin cushion shape. Moreover, the height of the incident light to the second lens L12 becomes so low that it becomes difficult to implement high magnification.

If the upper limit value of the conditional expression (6) is exceeded, it becomes difficult to implement telecentricity.

Moreover, the principal point position moves closer to the observation object Ob, which increases the total length of the optical system. Correction of distortion also becomes difficult.

To demonstrate the above mentioned effect with certainty, it is preferable that the lower limit value of the conditional expression (6) is −1.40. To demonstrate the above mentioned effect with certainty, it is preferable that the upper limit value of the conditional expression (6) is −1.00.

In the eyepiece optical system according to Embodiment 1, it is preferable that the following conditional expression (7) is satisfied.

$$1.35 < (R22+R21)/(R22-R21) < 2.40 \tag{7}$$

where R21 denotes a radius of curvature of the observation object Ob side lens surface of the second lens L12, and R22 denotes a radius of curvature of the eye point EP side lens surface of the second lens L12.

The conditional expression (7) specifies the shape of the second lens L12. If the conditional expression (7) is satisfied, appropriate magnification and eye relief ER can be implemented, and coma aberration and curvature of field can be corrected satisfactorily, even if a concave surface having a small radius of curvature is disposed on the observation object Ob side of the second lens L12, and the total length of the optical system is decreased.

If the lower limit value of the conditional expression (7) is not reached, the principal point position moves closer to the observation object Ob, which increases the size of the total optical system, and is not desirable. If the total length of the optical system is maintained, the focal length decreases, and securing the eye relief ER becomes difficult. Moreover, correction of distortion becomes insufficient, which is not desirable.

If the upper limit value of the conditional expression (7) is exceeded, light having a large angle of view enters the object side lens surface of the second lens L12 at a large angle, and major coma aberration and curvature of field are generated, and correction thereof becomes difficult.

To demonstrate the above mentioned effect with certainty, it is preferable that the lower limit value of the conditional expression (7) is 1.50. To demonstrate the above mentioned effect with certainty, it is preferable that the upper limit value of the conditional expression (7) is 1.85.

In the eyepiece optical system according to Embodiment 1, it is preferable that the following conditional expression (8) is satisfied.

$$1.60 < fe/(-f2) < 2.20 \tag{8}$$

where fe denotes a focal length of the eyepiece optical system, and f2 denotes a focal length of the second lens L12.

The conditional expression (8) specifies a ratio of the focal length of the second lens L12 with respect to the focal length of the total optical system. If the conditional expression (8) is satisfied, various aberrations, including coma aberration and distortion, can be corrected satisfactorily, even if the focal length of the total optical system is decreased to implement high magnification.

If the lower limit value of the conditional expression (8) is not reached, it becomes difficult to satisfactorily correct positive coma aberration and distortion generated in the first lens L11 and the third lens L13.

If the upper limit value of the conditional expression (8) is exceeded, the lateral chromatic aberration stands out, and correction thereof becomes difficult. Moreover, the lens diameter must be increased to prevent reflection of light on the side surface of the second lens L12.

To demonstrate the above mentioned effect with certainty, it is preferable that the lower limit value of the conditional expression (8) is 1.70. To demonstrate the above mentioned effect with certainty, it is preferable that the upper limit value of the conditional expression (8) is 2.00.

In the eyepiece optical system according to Embodiment 1, it is preferable that the first lens L11, the second lens L12 and the third lens L13 are all made of plastic. With this configuration, the above mentioned aberration correction capability (e.g. for coma aberration and distortion) can be sufficiently demonstrated.

In the eyepiece optical system according to Embodiment 1, it is preferable that at least one lens surface, out of the lens surfaces constituting the first lens L11, the second lens L12 and the third lens L13, is aspherical. In particular, the correction of coma aberration, astigmatism and distortion can be improved if the observation object Ob side lens surface of the second lens L12 is aspherical. Furthermore, the correction of distortion, coma aberration and spherical aberration can be improved if the eye point EP side lens surface of the third lens L13 is aspherical.

In the eyepiece optical system according to Embodiment 1, it is preferable that the first lens L11, the second lens L12 and the third lens L13 are all made of plastic. With this configuration, an aspherical surface can be easily introduced, and sufficient aberration correction capabilities can be demonstrated for various aberrations, including coma aberration and distortion.

In the eyepiece optical system according to Embodiment 1, the first lens L11 and the second lens L12 are simultaneously moved along the optical axis, whereby the diopter can be adjusted without dropping optical performance. If the third lens L13 is fixed on the optical axis with respect to the observation object Ob when adjusting the diopter, both the miniaturization of the eyepiece optical system and the dust proof performance can be implemented.

According to the eyepiece optical system of Embodiment 1 described above, an eyepiece optical system, in which various aberrations, particularly coma aberration and distortion, are satisfactorily corrected, can be implemented.

Figure 7:
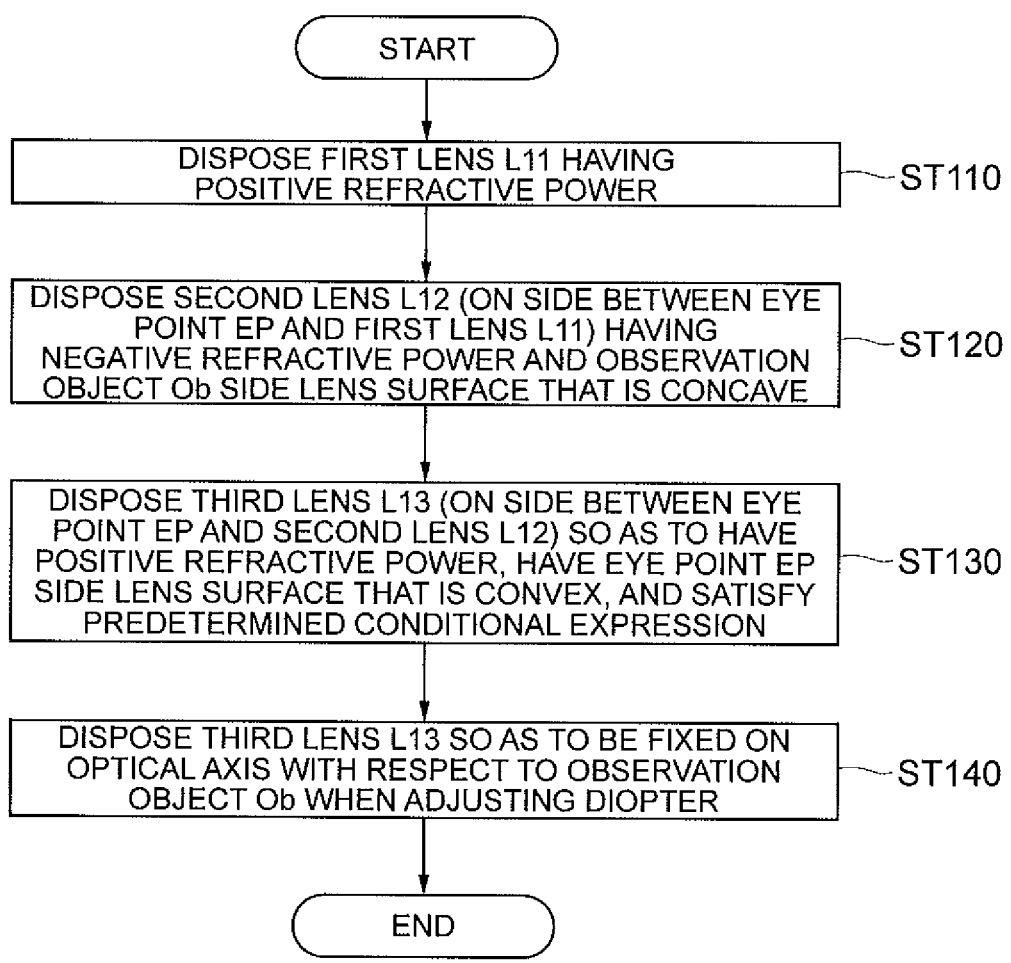
FIG. 7 is a flow chart depicting a method for manufacturing the eyepiece optical system according to Embodiment 1.

Now an outline of a method for manufacturing the above mentioned eyepiece optical system, which includes, in order from the observation object Ob, the first lens L11 having positive refractive power, the second lens L12 having negative refractive power, and the third lens L13 having positive refractive power, will be described with reference to FIG. 7. First the first lens L11 having positive refractive power is disposed in a cylindrical lens barrel (step ST110). Then the second lens L12, which has negative refractive power and of which observation object Ob side lens surface is concave, is disposed (on the side between the eye point EP and the first lens L11) (step ST120). Then the third lens L13, which has positive refractive power and of which the eye point EP side lens surface is convex, is disposed (on the side between the eye point EP and the second lens L12), so as to satisfy the following conditional expressions (1) and (2) (step ST130). Here the third lens L13 is disposed to be fixed on the optical axis with respect to the observation object Ob when adjusting the diopter (step ST140).

$$0.65 < R31/fe < 1.30 \tag{1}$$

$$-0.80 < (R32+R31)/(R32-R31) < -0.10 \tag{2}$$

where fe denotes a focal length of the eyepiece optical system, R31 denotes a radius of curvature of the observation object Ob side lens surface of the third lens L13, and R32 denotes a radius of curvature of the eye point side EP lens surface of the third lens L13.

According to an example of the lens arrangement of the eyepiece optical system of Embodiment 1, a positive meniscus lens having a convex surface facing the eye point EP is disposed as the first lens L11, as shown in FIG. 1. A negative meniscus lens having a concave surface facing the observation object Ob is disposed as the second lens L12. Then a positive biconvex lens satisfying the conditional expressions (1) and (2) is disposed as the third lens L13. When adjusting the diopter, the first lens L11 and the second lens L12 are simultaneously moved along the optical axis, while the third lens L13 is fixed on the optical axis with respect to the observation object Ob.

According to the method for manufacturing the eyepiece optical system of Embodiment 1, an eyepiece optical system, in which various aberrations, particularly coma aberration and distortion, are satisfactorily corrected, can be implemented.

EXAMPLES

Each example according to Embodiment 1 will now be described with reference to the drawings. Table 1 to Table 3 shown below are tables of each data of Example 1 to Example 3.

In each example, the d-line (wavelength: 587.5620 nm) and the g-line (wavelength: 435.8350 nm) are selected to calculate aberration characteristics.

In [General Data] in each table, fe denotes the focal length of the total eyepiece optical system, ω denotes an apparent angle of field (half angle of view) at $-1\ m^{-1}$, and TL denotes a total length of the eyepiece optical system (distance on the optical axis from observation object Ob surface at $-1\ m^{-1}$ to the lens surface closest to the eye point EP in the eyepiece optical system).

In [Lens Data] in each table, the surface number is the sequential number of the optical surface counted from the observation object Ob side in the light traveling direction, r denotes the radius of curvature of each optical surface, D denotes a distance on the optical axis from each optical surface to the next optical surface (or the eye point EP), νd denotes the Abbe number of the lens material at the d-line, nd denotes the refractive index of the lens material at the d-line, (variable) indicates the variable surface distance, "∞" in the radius of curvature r indicates a plane, and EP denotes the eye point respectively. The refractive index of air "1.0000" is omitted. If the optical surface is aspherical, "*" is attached to the surface number, and the paraxial radius of curvature is shown in the column of the radius of curvature r.

In [Aspherical Data] in each table, the form of the aspherical surface shown in [Lens Data] is indicated by the following expression (a). Here X(y) denotes a distance along the optical axis direction from a tangential plane at the vertex of the aspherical surface to each position on the aspherical surface at height y, r denotes a radius of curvature (paraxial radius of curvature) of the reference spherical surface, κ denotes a conical coefficient, and Ai denotes an aspherical coefficient in the i-th order. "E-n" indicates "×10$^{-n}$". For example, $1.234E{-}05 = 1.234\times10^{-5}$.

$$X(y) = (y^2/r)/\{1+(1-\kappa\cdot y^2/r^2)^{1/2}\} + A4\times y^4 + A6\times y^6 + A8\times y^8 \quad (a)$$

In [Conditional Expression] in each table, a value corresponding to each conditional expression (1) to (8) is shown.

For the unit of the diopter, "$m^{-1}$" is used. Diopter X [$m^{-1}$] refers to an image formed by the eyepiece optical system located at a position 1/X [m(meter)] on the optical axis from the eye point EP. (The sign is positive when the image is formed on the observer side from the eyepiece optical system.)

In all the data values herein below, "mm" is normally used as the unit of the focal length f, radius of curvature r, surface distance D and other lengths, unless otherwise specified, but the unit is not limited to "mm", and another appropriate unit may be used since an equivalent optical performance is obtained even if the optical system is proportionally expanded or proportionally reduced.

This description on a table is the same for all the examples, and is therefore omitted herein below.

Example 1

Example 1 will be described with reference to FIG. 1, FIG. 2 and Table 1. As FIG. 1 shows, an eyepiece optical system EL1 according to Example 1 includes, in order from an observation object (image display element) Ob, a first lens L11 having positive refractive power, a second lens L12 having negative refractive power, and a third lens L13 having positive refractive power.

The first lens L11 is a positive meniscus lens having a convex surface facing the eye point EP.

The second lens L12 is a negative meniscus lens having a concave surface facing the observation object Ob. The observation object Ob side lens surface of the second lens L12 is aspherical.

The third lens L13 is a positive biconvex lens. Both lens surfaces of the third lens L13 are aspherical.

The diopter is adjusted by simultaneously moving the first lens L11 and the second lens L12 along the optical axis. At this time, the third lens L13 is fixed on the optical axis with respect to the observation object Ob.

Table 1 shows each data value of Example 1. The surface numbers 1 to 7 in Table 1 correspond to optical surfaces m1 to m7 in FIG. 1 respectively. In Example 1, the surfaces 4, 6 and 7 are aspherical.

Each reference numeral and character in FIG. 1 is independent from other examples in order to simplify description. Therefore even if the reference numeral and character are the same as those in the drawing of another example, this does not mean that the configuration is necessarily the same as the other example.

TABLE 1

| [General Data] | | | |
|---|---|---|---|
| fe = 24.22 mm | | | |
| ω = 26.94° | | | |
| TL = 27.22 mm | | | |

| [Lens Data] | | | |
|---|---|---|---|
| Surface number | r | D | νd | nd |
| 1 | ∞ | 9.22 | | |
| 2 | −68.07911 | 3.60 | 56.27 | 1.5346 |
| 3 | −10.95401 | 3.10 | | |
| *4 | −6.25153 | 2.20 | 23.89 | 1.6355 |
| 5 | −28.62799 | 2.10 | | |

TABLE 1-continued

| | | | | |
|---|---|---|---|---|
| *6 | 18.96709 | 7.00 | 57.08 | 1.4911 |
| *7 | −11.76754 | 18.00 | | |
| EP | | | | |

[Aspherical Data]

Surface 4 κ = 0.18240, A4 = −0.15131E−03, A6 = −0.10572E−05, A8 = 0.30732E−08
Surface 6 κ = −0.49180, A4 = −0.11043E−03, A6 = 0.25830E−05, A8 = −0.24330E−07
Surface 7 κ = 0.92810, A4 = 0.84917E−04, A6 = 0.14380E−05, A8 = −0.11146E−07

[Conditional Expression]

Conditional Expression (1) R31/fe = 0.785
Conditional Expression (2) (R32 + R31)/(R32 − R31) = −0.234
Conditional Expression (3) fe/f3 = 1.512
Conditional Expression (4) fe/f1 = 1.012
Conditional Expression (5) f3/f1 = −0.669
Conditional Expression (6) (R12 + R11)/(R12 − R11) = 1.384
Conditional Expression (7) (R22 + R21)/(R22 − R21) = 1.559
Conditional Expression (8) fe/(−f2) = 1.848

As the data in Table 1 shows, the eyepiece optical system EL1 of Example 1 satisfies all the conditional expressions (1) to (8).

Figure 2:
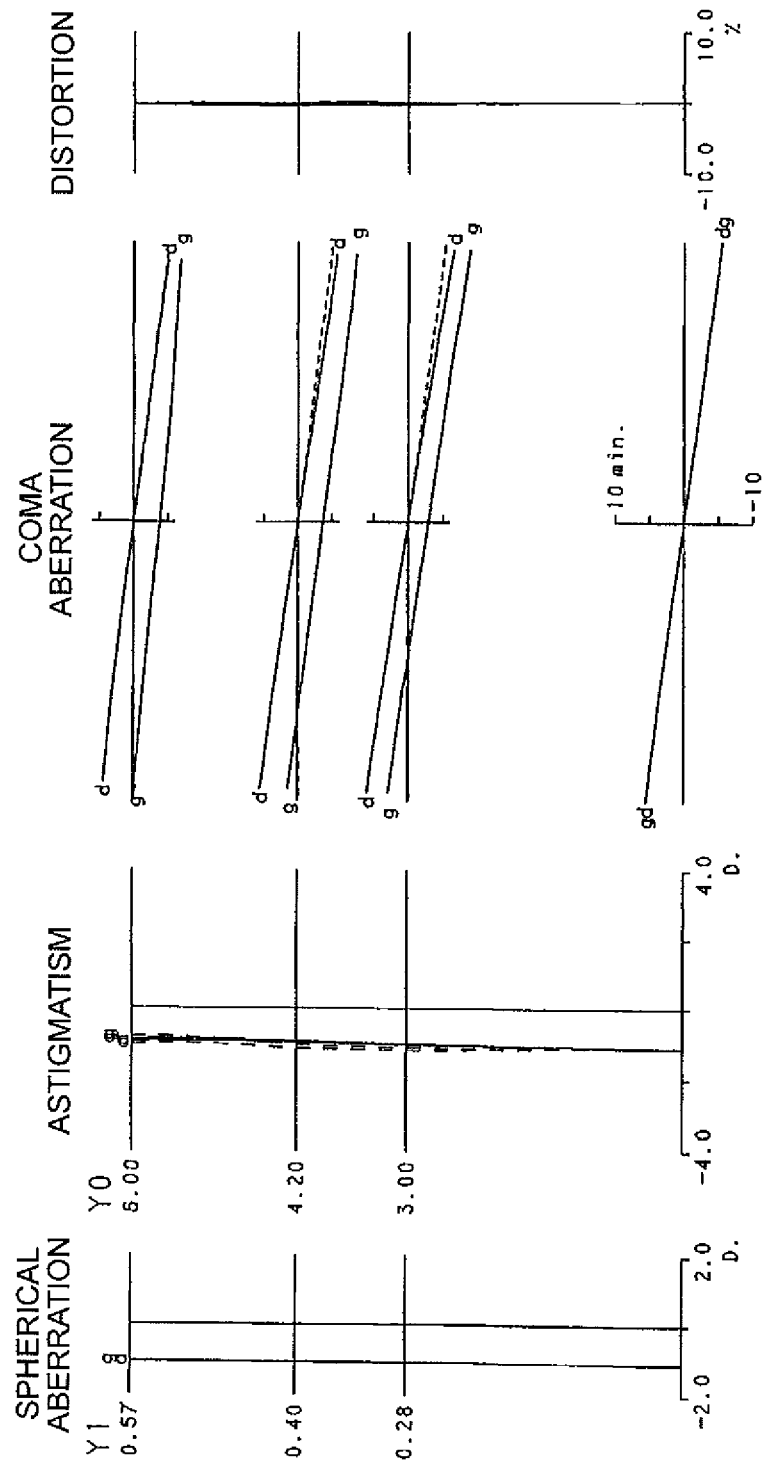
FIG. 2 are graphs showing various aberrations of the eyepiece optical system according to Example 1 when the diopter is $-1$ m$^{-1}$.

FIG. 2 are graphs showing various aberrations (spherical aberration, astigmatism, coma aberration and distortion) of the eyepiece optical system EL1 of Example 1 at diopter −1 $m^{-1}$.

In each graph showing aberrations, Y1 indicates the height of the incident light when light emitted from the optical axis center of the observation object Ob enters the tangential plane of the observation object Ob side lens surface of the first lens L11 of the eyepiece optical system 1, and Y0 indicates the height of the observation object Ob. d indicates an aberration curve at the d-line, and g indicates an aberration curve at the g-line. When neither d nor g are indicated, this means that the aberration curve is at the d-line. In the graph showing astigmatism, the solid line indicates the sagittal image surface, and the broken line indicates the meridional image surface. In the graph showing coma aberration, "min" indicates "minute" of the angle unit. In the graph showing spherical aberration and the graph showing astigmatism, the unit of the abscissa is [$m^{-1}$] respectively, which is indicated as "D." in the drawing.

The description on the graphs showing aberrations is the same for the other examples, where this description is omitted.

As each graph showing aberrations in FIG. 2 clarifies, in the eyepiece optical system EL1 of Example 1, various aberrations including coma aberration and distortion are satisfactorily corrected, and excellent optical performance is implemented.

Example 2

Figure 3:
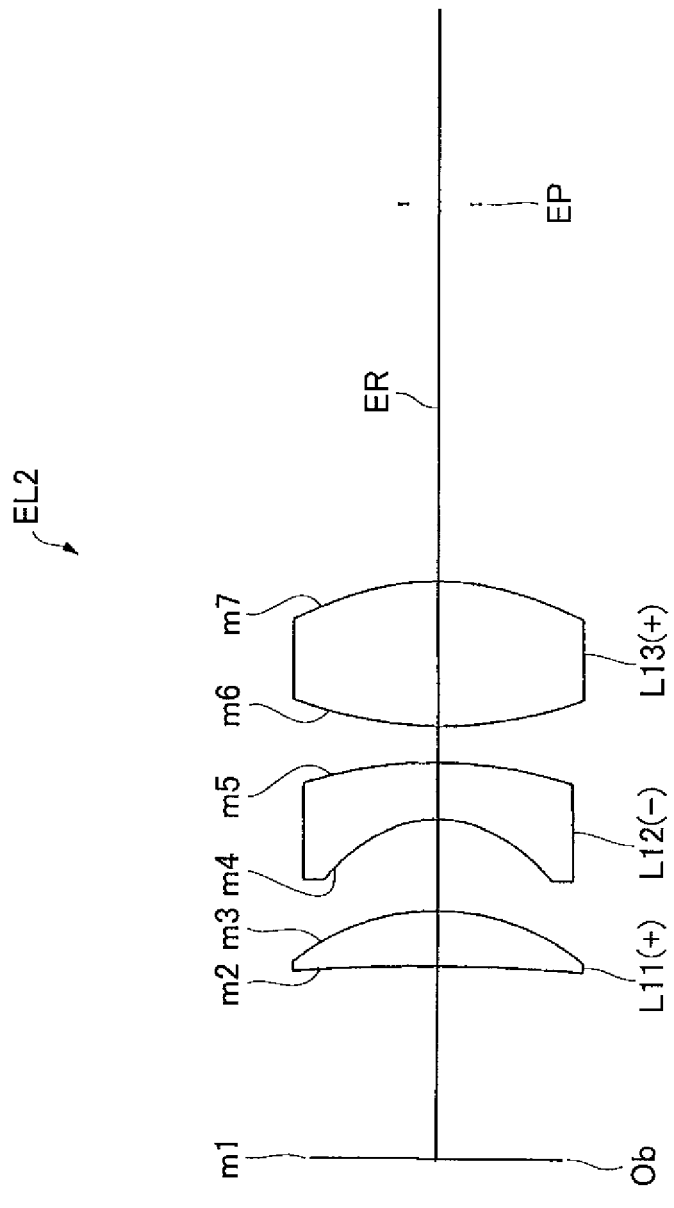
FIG. 3 is a diagram depicting a configuration of an eyepiece optical system according to Example 2.

Example 2 will be described with reference to FIG. 3, FIG. 4 and Table 2. As FIG. 3 shows, an eyepiece optical system EL2 according to Example 2 includes, in order from an observation object (image display element) Ob, a first lens L11 having positive refractive power, a second lens L12 having negative refractive power, and a third lens L13 having positive refractive power.

The first lens L11 is a positive meniscus lens having a convex surface facing the eye point EP.

The second lens L12 is a negative meniscus lens having a concave surface facing the observation object Ob. The observation object Ob side lens surface of the second lens L12 is aspherical.

The third lens L13 is a positive biconvex lens. Both lens surfaces of the third lens L13 are aspherical.

The diopter is adjusted by simultaneously moving the first lens L11 and the second lens L12 along the optical axis. At this time, the third lens L13 is fixed on the optical axis with respect to the observation object Ob.

Table 2 shows each data value of Example 2. The surface numbers 1 to 7 in Table 2 correspond to optical surfaces m1 to m7 in FIG. 3 respectively. In Example 2, the surfaces 4, 6 and 7 are aspherical.

TABLE 2

[General Data]

fe = 24.40 mm
ω = 26.94°
TL = 27.59 mm

[Lens Data]

| Surface number | r | D | νd | nd |
|---|---|---|---|---|
| 1 | ∞ | 9.24 | | |
| 2 | −94.80035 | 2.65 | 57.27 | 1.5346 |
| 3 | −11.21210 | 4.30 | | |
| *4 | −5.75284 | 2.70 | 23.89 | 1.6355 |
| 5 | −21.43005 | 1.70 | | |
| *6 | 18.02172 | 7.00 | 57.08 | 1.4911 |
| *7 | −12.24699 | 18.00 | | |
| EP | | | | |

[Aspherical Data]

Surface 4 κ = 0.20773, A4 = −0.68843E−04, A6 = −0.14503E−06, A8 = 0.35447E−07
Surface 6 κ = −0.15745, A4 = −0.81806E−04, A6 = 0.30864E−06, A8 = −0.13999E−07
Surface 7 κ = 0.02013, A4 = 0.85438E−04, A6 = −0.11291E−05, A8 = −0.21903E−07

[Conditional Expression]

Conditional Expression (1) R31/fe = 0.739
Conditional Expression (2) (R32 + R31)/(R32 − R31) = −0.191
Conditional Expression (3) fe/f3 = 1.519
Conditional Expression (4) fe/f1 = 1.037
Conditional Expression (5) f3/f1 = −0.683
Conditional Expression (6) (R12 + R11)/(R12 − R11) = 1.268
Conditional Expression (7) (R22 + R21)/(R22 − R21) = 1.734
Conditional Expression (8) fe/(−f2) = 1.840

As the data in Table 2 shows, the eyepiece optical system EL2 of Example 2 satisfies all the conditional expressions (1) to (8).

Figure 4:
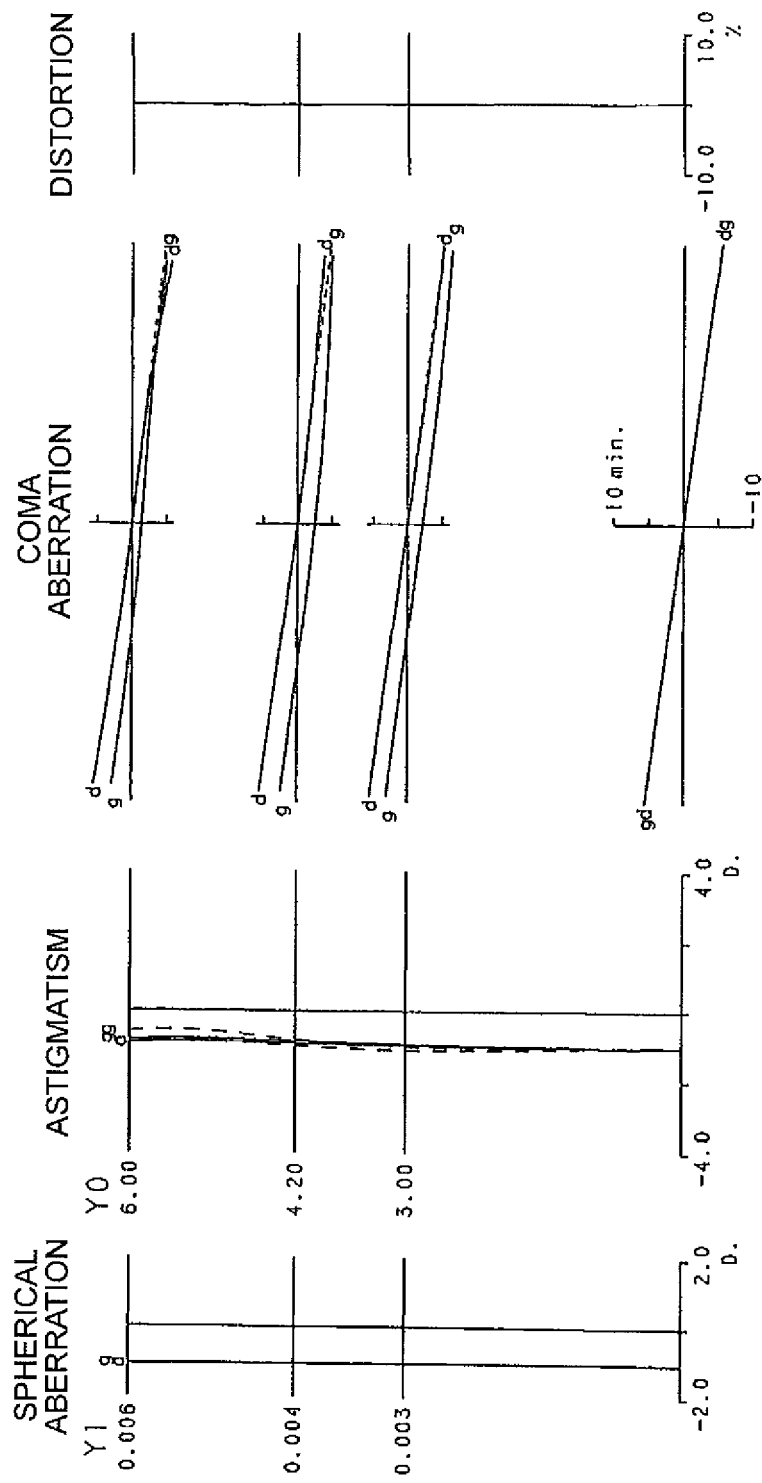
FIG. 4 are graphs showing various aberrations of the eyepiece optical system according to Example 2 when the diopter is $-1$ m$^{-1}$.

FIG. 4 are graphs showing various aberrations (spherical aberration, astigmatism, coma aberration and distortion) of the eyepiece optical system EL2 of Example 2 at diopter −1 $m^{-1}$. As each graph showing aberrations in FIG. 4 clarifies, in the eyepiece optical system EL2 of Example 2, various aberrations including coma aberration and distortion, are satisfactorily corrected, and excellent optical performance is implemented.

Example 3

Figure 5:
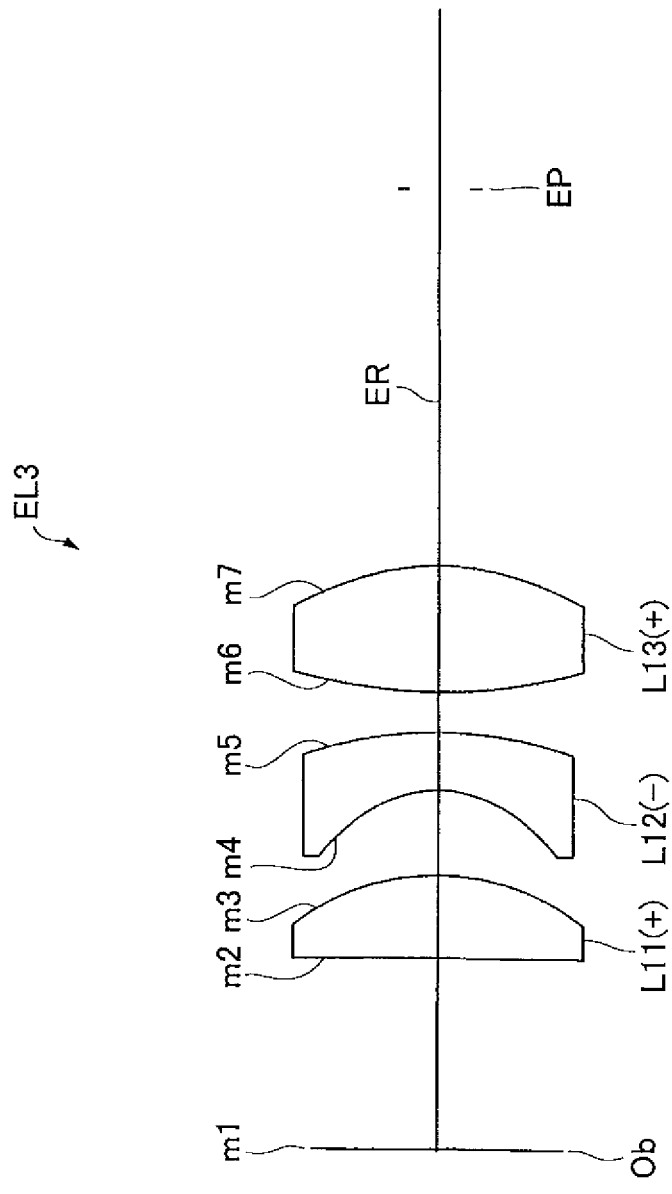
FIG. 5 is a diagram depicting a configuration of an eyepiece optical system according to Example 3.

Example 3 will be described with reference to FIG. 5, FIG. 6 and Table 3. As FIG. 5 shows, an eyepiece optical system EL3 according to Example 3 includes, in order from an observation object (image display element) Ob, a first lens L11 having positive refractive power, a second lens L12 having a negative refractive power, and a third lens L13 having positive refractive power.

The first lens L11 is a positive meniscus lens having a convex surface facing the eye point EP.

The second lens L12 is a negative meniscus lens having a concave surface facing the observation object Ob. The observation object Ob side lens surface of the second lens L12 is aspherical.

The third lens L13 is a positive biconvex lens. Both lens surfaces of the third lens L13 are aspherical.

The diopter is adjusted by simultaneously moving the first lens L11 and the second lens L12 along the optical axis. At this time, the third lens L13 is fixed on the optical axis with respect to the observation object Ob.

Table 3 shows each data value of Example 3. The surface numbers 1 to 7 in Table 3 correspond to optical surfaces m1 to m7 in FIG. 5 respectively. In Example 3, the surfaces 4, 6 and 7 are aspherical.

TABLE 3

[General Data]

fe = 24.33 mm
ω = 26.94°
TL = 27.94 mm

[Lens Data]

| Surface number | r | D | vd | nd |
|---|---|---|---|---|
| 1 | ∞ | 9.29 | | |
| 2 | −586.95141 | 3.90 | 56.27 | 1.5346 |
| 3 | −11.56718 | 4.00 | | |
| *4 | −5.81721 | 2.80 | 23.89 | 1.6355 |
| 5 | −20.00000 | 1.95 | | |
| *6 | 22.86389 | 6.00 | 57.08 | 1.4911 |
| *7 | −12.09967 | 18.00 | | |
| EP | | | | |

[Aspherical Data]

Surface 4 κ = 0.03802, A4 = −0.21670E−03, A6 = 0.99368E−06, A8 = −0.41222E−07
Surface 6 κ = 1.29364, A4 = −0.60351E−04, A6 = −0.78459E−06, A8 = 0.17247E−07
Surface 7 κ = 0.24623, A4 = 0.85196E−04, A6 = −0.11324E−05, A8 = 0.16074E−07

[Conditional Expression]

Conditional Expression (1) R31/fe = 0.940
Conditional Expression (2) (R32 + R31)/(R32 − R31) = −0.308
Conditional Expression (3) fe/f3 = 1.425
Conditional Expression (4) fe/f1 = 1.105
Conditional Expression (5) f3/f1 = −0.776
Conditional Expression (6) (R12 + R11)/(R12 − R11) = 1.040
Conditional Expression (7) (R22 + R21)/(R22 − R21) = 1.820
Conditional Expression (8) fe/(−f2) = 1.740

As the data in Table 3 shows, the eyepiece optical system EL3 of Example 3 satisfies all the conditional expressions (1) to (8).

Figure 6:
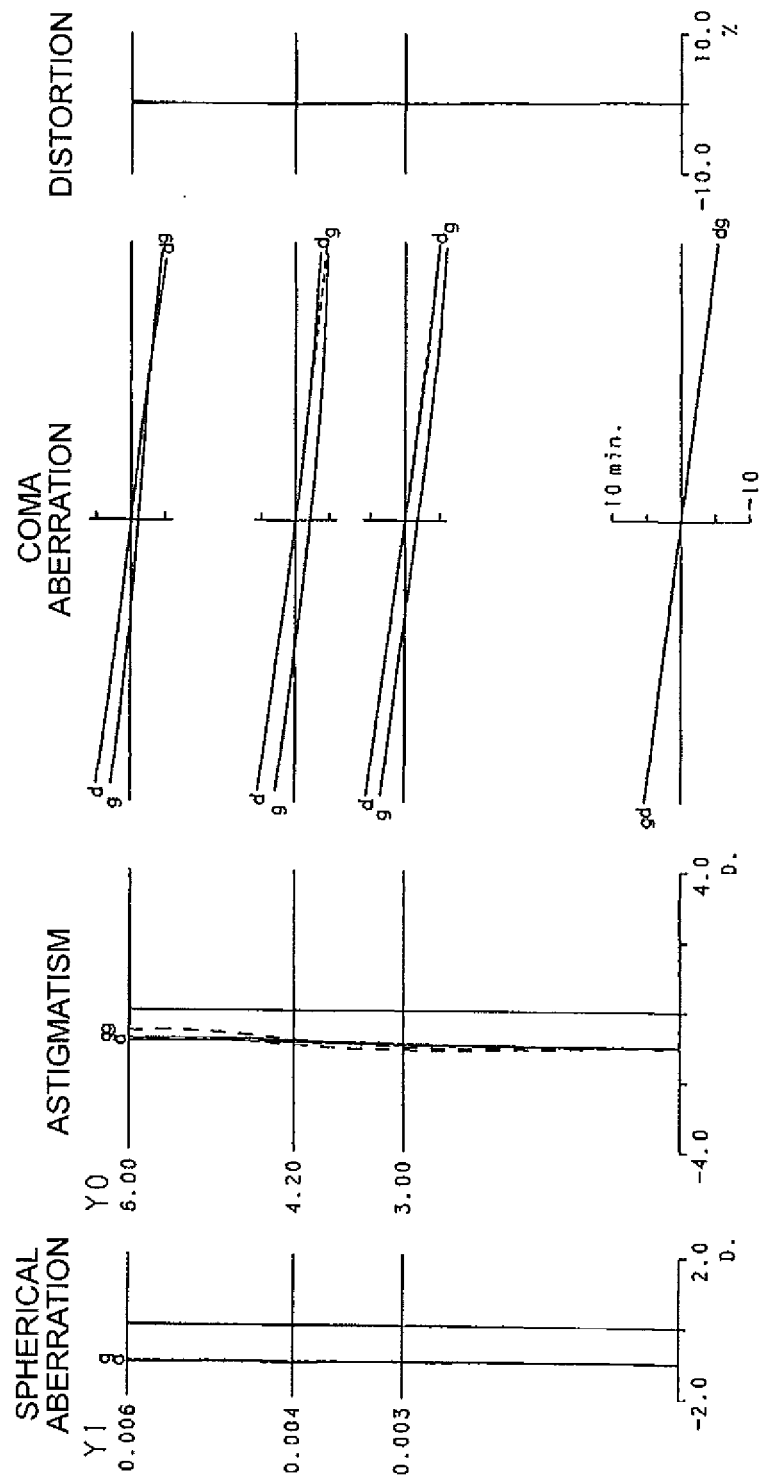
FIG. 6 are graphs showing various aberrations of the eyepiece optical system according to Example 3 when the diopter is $-1$ m$^{-1}$.

FIG. 6 are graphs showing various aberrations (spherical aberration, astigmatism, coma aberration and distortion) of the eyepiece optical system EL3 of Example 3 at diopter −1 m$^{-1}$. As each graph showing aberrations in FIG. 6 clarifies, in the eyepiece optical system EL3 of Example 3, various aberrations including coma aberration and distortion, are satisfactorily corrected, and excellent optical performance is implemented.

As described above, according to Example 1 to 3, an eyepiece optical system, in which various aberrations (particularly coma aberration and distortion) are satisfactorily corrected while securing an apparent angle of field not less than 25°, can be implemented.

Embodiment 2

Figure 8:
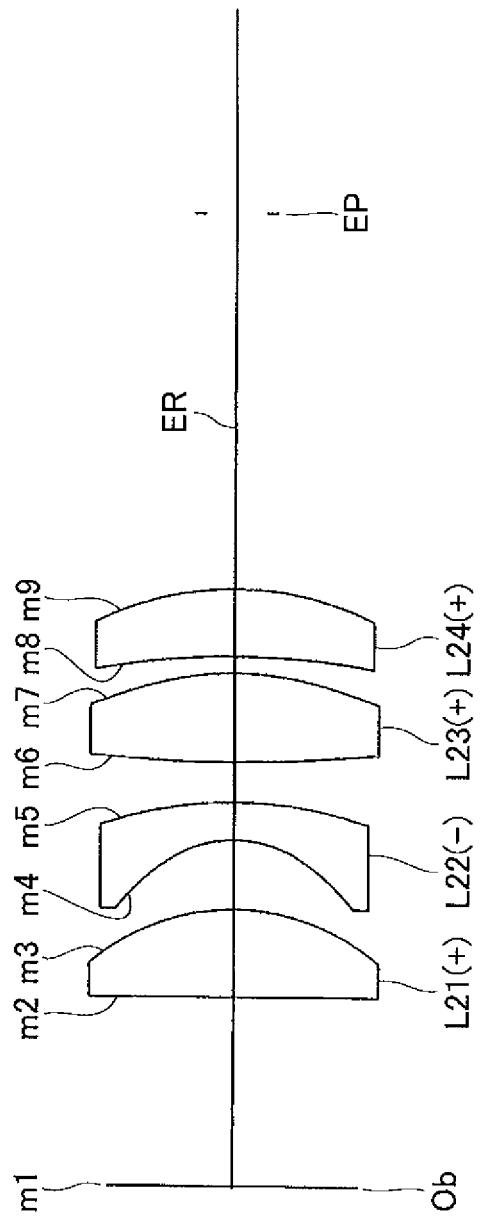
FIG. 8 is a diagram depicting a configuration of an eyepiece optical system according to Example 4.

As shown in FIG. 8, in an eyepiece optical system according to Embodiment 2, a first lens L21 having positive refractive power is disposed near an observation object (image display element) Ob, a second lens L22, which has negative refractive power and of which observation object Ob side lens surface is concave, is disposed to correct spherical aberration and curvature of field generated in the first lens L21, and a third lens L23, which has positive refractive power and of which eye point EP side lens surface is convex, is disposed to correct coma aberration and distortion, and at least one lens surface, out of the lens surfaces constituting the first lens L21, the second lens L22 and the third lens L23, is aspherical. By satisfying the later mentioned conditional expressions (9) to (11) in this configuration, the above mentioned problems are solved.

In Embodiment 2, the second lens L22 is constituted by one single lens, but the same effect can be implemented even if the second lens L12 is constituted by two lenses.

Further, in Embodiment 2, the third lens L23 is constituted by one single lens, but the same effect can be implemented even if the third lens L23 is constituted by two lenses.

In this configuration, the eyepiece optical system according to Embodiment 2 satisfies the following conditional expressions (9) to (11).

$$0.40 < f3/f1 < 2.50 \quad (9)$$

$$-2.00 < (R12+R11)/(R12-R11) < -0.75 \quad (10)$$

$$1.35 < (R22+R21)/(R22-R21) < 2.40 \quad (11)$$

where f1 denotes a focal length of the first lens L21, f3 denotes a focal length of the third lens L23, R11 denotes a radius of curvature of the observation object Ob side lens surface of the first lens L21, R12 denotes a radius of curvature of the eye point EP side lens surface of the first lens L21, R21 denotes a radius of curvature of the observation object Ob side lens surface of the second lens L22, and R22 denotes a radius of curvature of the eye point EP side lens surface of the second lens L22.

The conditional expression (9) specifies a ratio of the focal length of the third lens L23 with respect to the focal length of the first lens L21 in order to satisfactorily correct distortion and coma aberration, which worsen as the positive refractive power of the first lens L21 and the third lens L23 become stronger due to the increase in magnification of the eyepiece optical system. In concrete terms, the conditional expression (9) specifies the condition to balance the first lens L21 and the third lens L23, so that considerable distortion, generated in the first lens L21, is excessively corrected by the second lens L22, and this excessive correction by the second lens L22 is further corrected using the distortion generated in the third lens L23.

If the lower limit value of the conditional expression (9) is not reached, the correction of distortion in the second lens L22 becomes excessive, and negative distortion is generated, which deforms the observation field of view to a barrel shape. Moreover, coma aberration generated in the second lens L22 becomes too high, which makes it difficult to correct in the third lens L13.

If the upper limit value of the conditional expression (9) is exceeded, the correction amount in the second lens L22 becomes insufficient and it becomes difficult to correct distortion generated in the third lens L23, and as a result, positive distortion remains. Moreover, field tilt is generated on the positive diopter side because of the strong positive refractive power of the third lens L23.

To demonstrate the above mentioned effect with certainty, it is preferable that the lower limit value of the conditional expression (9) is 0.60. To demonstrate the above mentioned effect with certainty, it is preferable that the upper limit value of the conditional expression (9) is 1.20.

The conditional expression (10) specifies the shape of the first lens L21 to satisfactorily correct distortion and curvature of field, which worsen as the positive refractive power of the first lens L21 becomes stronger due to the increase in magnification of the optical system.

If the lower limit value of the conditional expression (10) is not reached, the eye point EP side lens surface of the first lens L21 has an even stronger positive refractive power, which generates major distortion in a pin cushion shape. Moreover, the height of the incident light to the second lens L22 becomes so low that it becomes difficult to implement high magnification.

If the upper limit value of the conditional expression (10) is exceeded, it becomes difficult to implement telecentricity. Moreover, the principal point position moves closer to the observation object Ob, which increases the total length of the optical system. Correction of distortion also becomes difficult.

To demonstrate the above mentioned effect with certainty, it is preferable that the lower limit value of the conditional expression (10) is −1.40. To demonstrate the above mentioned effect with certainty, it is preferable that the upper limit value of the conditional expression (10) is −1.00.

The conditional expression (11) specifies the shape of the second lens L22. If the conditional expression (11) is satisfied, appropriate magnification and eye relief ER can be implemented, and coma aberration and curvature of field can be corrected satisfactorily, even if a concave surface having a small radius of curvature is disposed on the observation object Ob side of the second lens L22, and the total length of the optical system is decreased. Here the eye relief ER refers to a distance on the optical axis from the lens surface closest to the observation eye of the eyepiece optical system to the eye point EP.

If the lower limit value of the conditional expression (11) is not reached, the principal point position moves closer to the observation object Ob, which increases the size of the total optical system, and is not desirable. If the total length of the optical system is maintained, the focal length decreases, and securing the eye relief ER becomes difficult. Moreover, correction of distortion becomes insufficient, which is not desirable.

If the upper limit value of the conditional expression (11) is exceeded, light having a large angle of view enters the object side lens surface of the second lens L22 at a large angle, and major coma aberration and curvature of field are generated, and correction thereof becomes difficult.

To demonstrate the above mentioned effect with certainty, it is preferable that the lower limit value of the conditional expression (11) is 1.50. To demonstrate the above mentioned effect with certainty, it is preferable that the upper limit value of the conditional expression (11) is 1.85.

In the eyepiece optical system according to Embodiment 2, it is preferable that the following conditional expression (12) is satisfied.

$$1.60 < fe/(-f2) < 2.20 \tag{12}$$

where fe denotes a focal length of the eyepiece optical system, and f2 denotes a focal length of the second lens L22.

The conditional expression (12) specifies a ratio of the focal length of the second lens L22 with respect to the focal length of the total optical system. If the conditional expression (12) is satisfied, various aberrations, including coma aberration and distortion, can be corrected satisfactorily, even if the focal length of the total optical system is decreased to implement high magnification.

If the lower limit value of the conditional expression (12) is not reached, it becomes difficult to satisfactorily correct positive coma aberration and distortion generated in the first lens L21 and the third lens L23.

If the upper limit value of the conditional expression (12) is exceeded, the lateral chromatic aberration stands out, and correction thereof becomes difficult. Moreover, the lens diameter must be increased to prevent reflection of light on the side surface of the second lens L22.

To demonstrate the above mentioned effect with certainty, it is preferable that the lower limit value of the conditional expression (12) is 1.70. To demonstrate the above mentioned effect with certainty, it is preferable that the upper limit value of the conditional expression (12) is 2.00.

In the eyepiece optical system according to Embodiment 2, it is preferable that the following conditional expression (13) is satisfied.

$$0.60 < fe/f1 < 2.00 \tag{13}$$

where fe denotes a focal length of the eyepiece optical system.

The conditional expression (13) specifies a ratio of the focal length of the first lens L21 with respect to the focal length of the total optical system.

If the lower limit value of the conditional expression (13) is not reached, it becomes difficult to implement telecentricity, and appearance when the eye is slightly shifted on the eye point EP drops considerably. Moreover, the third lens L23 becomes large. Furthermore, distortion worsens.

If the upper limit value of the conditional expression (13) is exceeded, correction of aberration (e.g. distortion) becomes difficult in the second lens L22. Moreover, the height of incident light to the third lens L23 becomes low, which makes it difficult to implement sufficient magnification and eye relief ER.

To demonstrate the above mentioned effect with certainty, it is preferable that the lower limit value of the conditional expression (13) is 1.00. To demonstrate the above mentioned effect with certainty, it is preferable that the upper limit value of the conditional expression (13) is 1.20.

According to the eyepiece optical system of Embodiment 2 described above, an eyepiece optical system, in which various aberrations, particularly coma aberration and distortion, are satisfactorily corrected, can be implemented.

Figure 10:
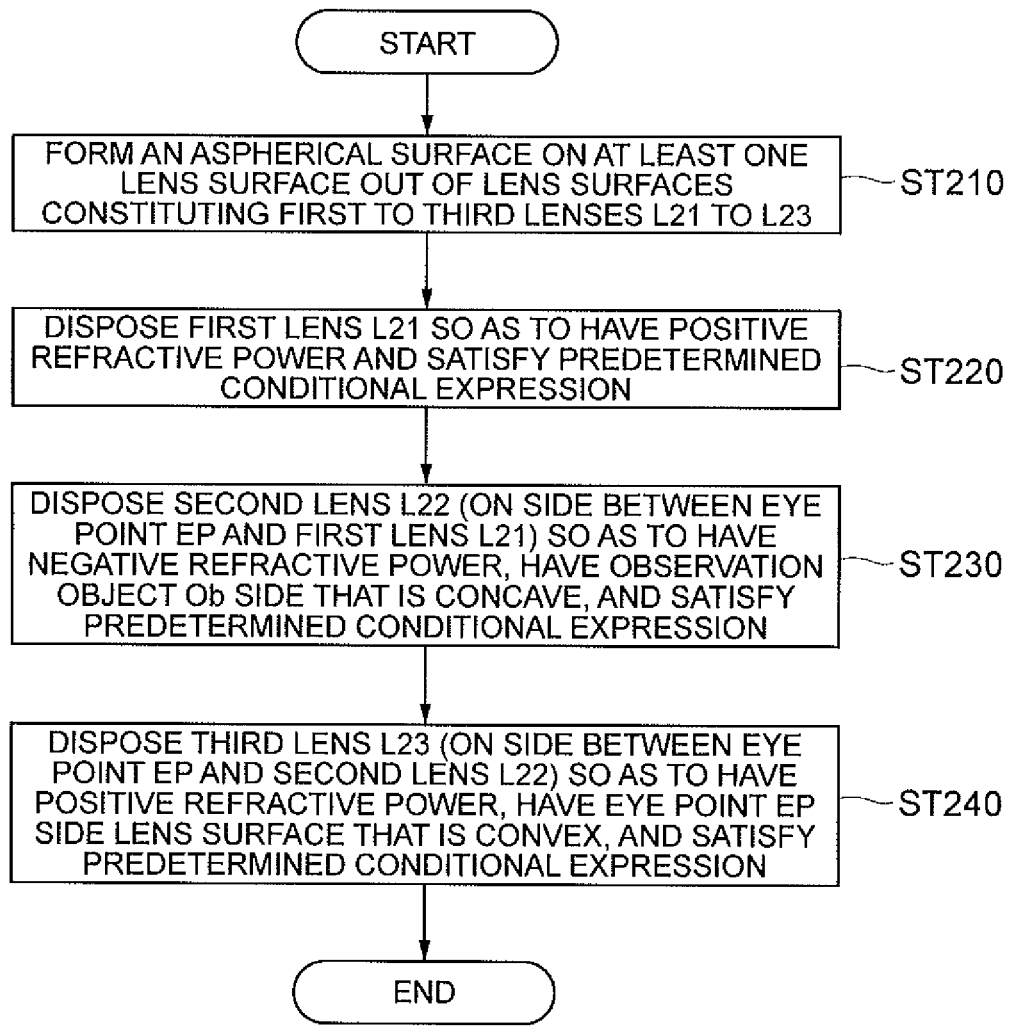
FIG. 10 is a flow chart depicting a method for manufacturing the eyepiece optical system according to Embodiment 2.

Now an outline of a method for manufacturing the above mentioned eyepiece optical system that includes, in order from the observation object Ob, the first lens L21 having positive refractive power, the second lens L22 having negative refractive power, and the third lens L23 having positive refractive power, will be described with reference to FIG. 10. First an aspherical surface is formed on at least one lens surface out of the lens surfaces constituting the first lens L21, the second lens L22 and the third lens L23 (step ST210). Then the first lens L21 having positive refractive power is disposed in a cylindrical lens barrel so as to satisfy the following conditional expressions (9) and (10) (step ST220). Then the second lens, which has negative refractive power and of which observation object Ob side lens surface is concave, is disposed (on the side between the eye point EP and the first lens L21), so as to satisfy the following conditional expression (11) (step ST230). Then the third lens L23, which has positive refractive power and of which eye point EP side lens surface is convex, is disposed (on the side between the eye point EP and the second lens L22) so as to satisfy the conditional expression (9) (step ST240).

$$0.40 < f3/f1 < 2.50 \quad (9)$$

$$-2.00 < (R12+R11)/(R12-R11) < -0.75 \quad (10)$$

$$1.35 < (R22+R21)/(R22-R21) < 2.40 \quad (11)$$

where f1 denotes a focal length of the first lens L21, f3 denotes a focal length of the third lens L23, R11 denotes a radius of curvature of the observation object Ob side lens surface of the first lens L21, R12 denotes a radius of curvature of the eye point EP side lens surface of the first lens L21, R21 denotes a radius of curvature of the observation object side lens surface of the second lens L22, and R22 denotes a radius of curvature of the eye point side lens surface of the second lens L22.

According to an example of the lens arrangement of the eyepiece optical system of Embodiment 2, a positive meniscus lens, which has a convex surface facing the eye point EP and satisfies the conditional expressions (9) and (10), is disposed as the first lens L21, as shown in FIG. 8. A negative meniscus lens, which has a concave surface facing the observation object Ob and satisfies the conditional expression (11), is disposed as the second lens L22. A positive biconvex lens, which satisfies the conditional expression (9), is disposed as the third lens L23. When adjusting the diopter, the first lens L21 and the second lens L22 are simultaneously moved along the optical axis, while the third lens L23 is fixed on the optical axis with respect to the observation object Ob.

According to the method for manufacturing the eyepiece optical system of Embodiment 2, an eyepiece optical system, in which various aberrations, particularly coma aberration and distortion, are satisfactorily corrected, can be implemented.

An example according to Embodiment 2 will now be described with reference to the drawings. Table 4 shown below is a table of each data of Example 4.

In Example 4, the d-line (wavelength: 587.5620 nm) and the g-line (wavelength: 435.8350 nm) are selected to calculate aberration characteristics.

In [General Data] in each table, fe denotes the focal length of the total eyepiece optical system, ω denotes an apparent angle of field (half angle of view) at $-1 \text{ m}^{-1}$, and TL denotes a total length of the eyepiece optical system (distance on the optical axis from the observation object Ob surface at $-1$ $\text{m}^{-1}$ to the lens surface closest to the eye point EP in the eyepiece optical system).

In [Lens Data] in each table, the surface number is the sequential number of the optical surface counted from the observation object Ob side in the light traveling direction, r denotes the radius of curvature of each optical surface, D denotes a distance on the optical axis from each optical surface to the next optical surface (or the eye point EP), vd denotes the Abbe number of the lens material at the d-line, nd denotes the refractive index of the lens material at the d-line, (variable) indicates the variable surface distance, "∞" in the radius of curvature r indicates a plane, and EP denotes the eye point respectively. The refractive index of air "1.0000" is omitted. If the optical surface is aspherical, "*" is attached to the surface number, and the paraxial radius of curvature is shown in the column of the radius of curvature r.

In [Aspherical Data] in each table, the form of the aspherical surface shown in [Lens Data] is indicated by the following expression (a). Here X(y) denotes a distance along the optical axis direction from a tangential plane at the vertex of the aspherical surface to each position on the aspherical surface at height y, r denotes a radius of curvature (paraxial radius of curvature) of the reference spherical surface, κ denotes a conical coefficient, and Ai denotes an aspherical coefficient in the i-th order. "E-n" indicates "×10$^{-n}$". For example, 1.234E-05=1.234×10$^{-5}$.

$$X(y)=(y^2/r)/\{1+(1-\kappa \cdot y^2/r^2)^{1/2}\}+A4 \times y^4+A6 \times y^6+A8 \times y^8 \quad (a)$$

In [Conditional Expression] in each table, a value corresponding to each conditional expression (9) to (13) is shown.

For the unit of the diopter, "m$^{-1}$" is used. Diopter X [m$^{-1}$] refers to an image formed by the eyepiece optical system located at a position 1/X [m(meter)] on the optical axis from the eye point EP. (The sign is positive when the image is formed on the observer side from the eyepiece optical system.)

In all the data values herein below, "mm" is normally used as the unit of the focal length f, radius of curvature r, surface distance D and other lengths, unless otherwise specified, but the unit is not limited to "mm", and another appropriate unit may be used since an equivalent optical performance is obtained even if the optical system is proportionally expanded or proportionally reduced.

Example 4

Example 4 will be described with reference to FIG. 8, FIG. 9 and Table 4. As FIG. 8 shows, an eyepiece optical system EL4 according to Example 4 includes, in order from an observation object (image display element) Ob, a first lens L21 having positive refractive power, a second lens L22 having negative refractive power, a third lens L23 having positive refractive power, and a fourth lens L24 having positive refractive power.

The first lens L21 is a positive meniscus lens having a convex surface facing the eye point EP.

The second lens L22 is a negative meniscus lens having a concave surface facing the observation object Ob. The observation object Ob side lens surface of the second lens L22 is aspherical.

The third lens L23 is a positive biconvex lens. The eye point EP side lens surface of the third lens L23 is aspherical.

The fourth lens L24 is a positive meniscus lens having a convex surface facing the eye point EP.

The diopter is adjusted by simultaneously moving the first lens L21 and the second lens L22 along the optical axis. At this time, the third lens L23 and the fourth lens L24 are fixed on the optical axis with respect to the observation object Ob.

Table 4 shows each data value of Example 4. The surface numbers 1 to 9 in Table 4 correspond to optical surfaces m1 to m9 in FIG. 8 respectively. In Example 4, the surfaces 4 to 7 are aspherical.

TABLE 4

| [General Data] |
| --- |
| fe = 24.36 mm |
| ω = 26.94° |
| TL = 28.54 mm |

TABLE 4-continued

[Lens Data]

| Surface number | r | D | vd | nd |
|---|---|---|---|---|
| 1 | ∞ | 9.14 | | |
| 2 | −991.21127 | 4.20 | 56.21 | 1.5244 |
| 3 | −10.77978 | 3.30 | | |
| *4 | −5.64800 | 1.80 | 23.89 | 1.6355 |
| 5 | −20.00000 | 1.90 | | |
| 6 | 68.73187 | 4.20 | 56.21 | 1.5244 |
| *7 | −14.36226 | 0.80 | | |
| 8 | −38.01281 | 3.20 | 57.08 | 1.4911 |
| 9 | −15.33151 | 18.00 | | |
| EP | | | | |

[Aspherical Data]

Surface 4 κ = 0.31951, A4 = −0.86593E−04, A6 = 0.17091E−05, A8 = −0.14183E−07
Surface 7 κ = 0.03346, A4 = 0.82458E−04, A6 = 0.17787E−06, A8 = 0.00000E+00

[Conditional Expression]

Conditional Expression (9) f3/f1 = −1.111
Conditional Expression (10) (R12 + R11)/(R12 − R11) = 1.022
Conditional Expression (11) (R22 + R21)/(R22 − R21) = 1.787
Conditional Expression (12) fe/(−f2) = 1.871
Conditional Expression (13) fe/f1 = 1.174

As the data in Table 4 shows, the eyepiece optical system EL4 of Example 4 satisfies all the conditional expressions (9) to (13).

Figure 9:
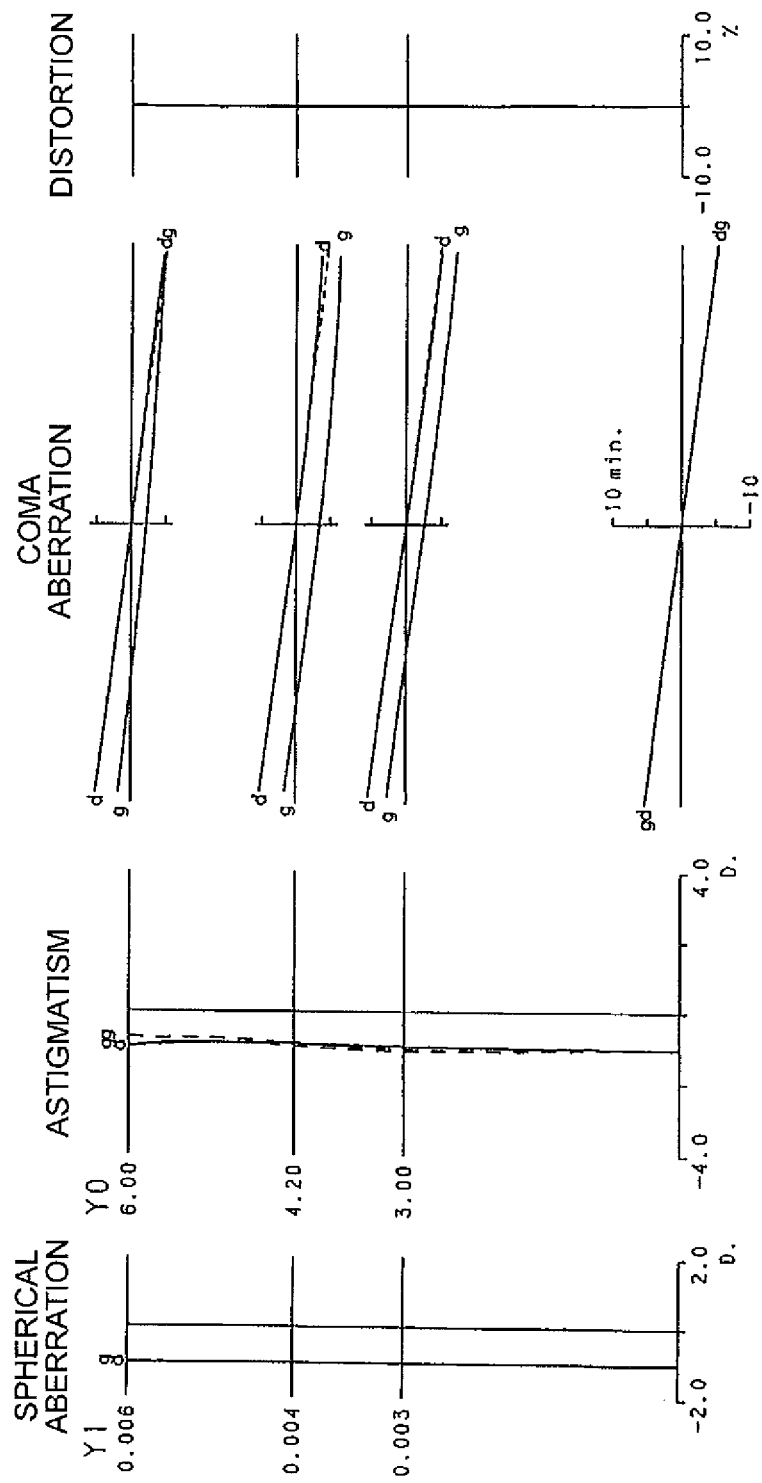
FIG. 9 are graphs showing various aberrations of the eyepiece optical system according to Example 4 when the diopter is $-1$ m$^{-1}$.

FIG. 9 are graphs showing various aberrations (spherical aberration, astigmatism, coma aberration and distortion) of the eyepiece optical system EL4 of Example 4 at diopter −1 $m^{-1}$. As each graph showing aberrations in FIG. 9 clarifies, in the eyepiece optical system EL4 of Example 4, various aberrations including coma aberration and distortion, are satisfactorily corrected, and excellent optical performance is implemented.

As described above, according to Example 4, an eyepiece optical system, in which various aberrations (particularly coma aberration and distortion) are satisfactorily corrected while securing an apparent angle of field not less than 25°, can be implemented.

Figure 11:
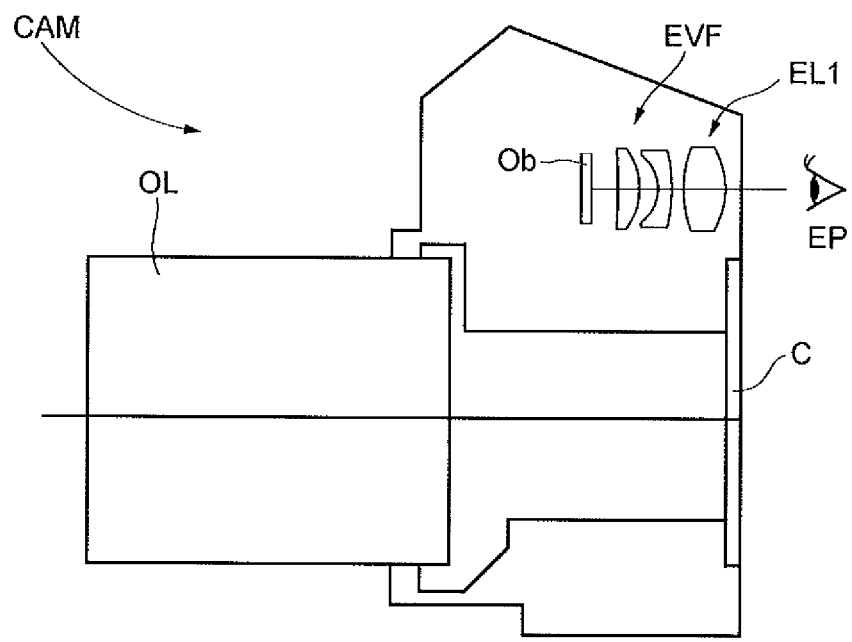
FIG. 11 is a cross-sectional view of a digital camera.

Now a digital camera (optical apparatus) CAM including the eyepiece optical system according to Embodiment 1 or 2 will be described with reference to FIG. 11. A case of including the eyepiece optical system EL1 according to Example 1 (see FIG. 1) will be described, but the other examples can be used just the same.

The digital camera CAM is constituted by an objective lens OL, a picture element C, such as CCD and CMOS, and an electronic view finder EVF. The electronic view finder EVF includes an image display element (observation object) Ob such as a liquid crystal display element, and the eyepiece optical system EL1 for magnifying and observing an image displayed on the image display element Ob.

In the digital camera CAM having the above configuration, light from an object (not illustrated) is collected by the objective lens OL and forms an image of the object on the picture element C. The image of the object formed on the picture element C is captured by the picture element C, and the image of the object captured by the picture element C is displayed on the image display element Ob. The user positions an eye on the eye point EP, whereby the image of the object formed by the objective lens OL can be observed in a magnified state via the eyepiece optical system EL.

If the user presses a release button (not illustrated), the image captured by the picture element C (that is, an image corresponding to the image which is displayed on the image display element Ob and is observed by the eyepiece optical system EL1) is recorded in a memory (not illustrated) as an image of the object. In this way, the user can photograph an object using the digital camera CAM.

According to the above mentioned digital camera CAM including the eyepiece optical system EL1 of Example 1, a camera in which various aberrations, particularly coma aberration and distortion, are satisfactorily corrected, can be implemented.

The present invention has been described with configurational requirements of each embodiment to assist understanding of the present invention, but needless to say, the present invention is not limited to these configurational requirements.

In each example, the eyepiece optical system is constituted by three or four lens groups, but the present invention can also be applied to a configuration using a different number of lens groups, such as five or six lens groups. In a configuration, a lens or a lens group may be added to the side closest to the object, or a lens or a lens group may be added to the side closest to the image. A "lens group" refers to a portion having at least one lens isolated by an air gap which changes when zooming or focusing occur.

The lens surface may be formed to be a spherical surface or a plane, or an aspherical surface. If the lens surface is a spherical surface or a plane, lens processing, assembly and adjustment are easy, and deterioration of the optical performance, due to an error in processing, assembly and adjustment, can be prevented. Even if the image plane deviates, the writing performance does not change very much. If the lens surface is an aspherical surface, the aspherical surface can be any aspherical surface out of an aspherical surface generated by grinding, a glass-molded aspherical surface generated by forming glass in an aspherical shape using a die, and a composite aspherical surface generated by forming resin on the surface of the glass so as to be an aspherical shape. The lens surface may be a diffraction surface, and the lens may be a refractive index distributed lens (GRIN lens) or a plastic lens.

Each lens surface may be coated with an anti-reflection film, which has high transmittance in a wide wavelength region, in order to decrease flares and ghosts, implementing a high optical performance at high contrast.

EXPLANATION OF NUMERALS AND CHARACTERS

EL1 to EL3 eye piece optical system according to Embodiment 1
L11 first lens according to Embodiment 1
L12 second lens according to Embodiment 1
L13 third lens according to Embodiment 1
L14 eyepiece optical system according to Embodiment 2
L21 first lens according to Embodiment 2
L22 second lens according to Embodiment 2
L23 third lens according to Embodiment 2
L24 fourth lens according to Embodiment 2
CAM digital camera (optical apparatus)
OL objective lens
C picture element
Ob image display element (observation object)
EP eye point

The invention claimed is:

1. An eyepiece optical system comprising, in order from an observation object:
   a first lens having positive refractive power;
   a second lens which has negative refractive power and of which an observation object side lens surface is concave; and
   a third lens which has positive refractive power and of which an eye point side lens surface is convex,
   the third lens being fixed on an optical axis with respect to the observation object when adjusting a diopter, and the following conditional expressions being satisfied:

$$0.65 < R31/fe < 1.30 \quad (1)$$

$$-0.80 < (R32+R31)/(R32-R31) < -0.10 \quad (2)$$

$$1.00 < fe/f3 < 1.60 \quad (3A)$$

where fe denotes a focal length of the eyepiece optical system, R31 denotes a radius of curvature of an observation object side lens surface of the third lens, R32 denotes a radius of curvature of the eye point side lens surface of the third lens, and f3 denotes a focal length of the third lens.

2. The eyepiece optical system according to claim 1, wherein the observation object is an image display element.

3. The eyepiece optical system according to claim 2, wherein the image display element is a liquid crystal display element.

4. The eyepiece optical system according to claim 1, wherein the following conditional expression is satisfied:

$$0.60 < fe/f1 < 2.00$$

where fe denotes a focal length of the eyepiece optical system, and f1 denotes a focal length of the first lens.

5. The eyepiece optical system according to claim 1, wherein the following conditional expression is satisfied:

$$0.40 < f3/f1 < 2.50$$

where f1 denotes a focal length of the first lens, and f3 denotes a focal length of the third lens.

6. The eyepiece optical system according to claim 1, wherein the following conditional expression is satisfied:

$$-2.00 < (R12+R11)/(R12-R11) < -0.75$$

where R11 denotes a radius of curvature of an observation object side lens surface of the first lens, and R12 denotes a radius of curvature of an eye point side lens surface of the first lens.

7. The eyepiece optical system according to claim 1, wherein the following conditional expression is satisfied:

$$1.35 < (R22+R21)/(R22-R21) < 2.40$$

where R21 denotes a radius of curvature of the observation object side lens surface of the second lens, and R22 denotes a radius of curvature of an eye point side lens surface of the second lens.

8. The eyepiece optical system according to claim 1, wherein the following conditional expression is satisfied:

$$1.60 < fe/(-f2) < 2.20$$

where fe denotes a focal length of the eye piece optical system, and f2 denotes a focal length of the second lens.

9. The eyepiece optical system according to claim 1, wherein the first lens, the second lens and the third lens are all made of plastic.

10. The eyepiece optical system according to claim 1, wherein the observation object side lens surface of the second lens is aspherical.

11. The eyepiece optical system according to claim 1, wherein the eye point side lens surface of the third lens is aspherical.

12. The eyepiece optical system according to claim 1, wherein the diopter is adjusted by moving the first lens and the second lens along the optical axis.

13. An optical apparatus comprising:
    an objective lens;
    a picture element that captures an image formed by the objective lens;
    an image display element that displays the image captured by the picture element; and
    an eyepiece optical system for observing the image displayed on the image display element,
    the eyepiece optical system being the eyepiece optical system according to claim 1.

14. An eyepiece optical system comprising, in order from an observation object along an optical axis:
    a first lens having positive refractive power;
    a second lens which has negative refractive power, and of which an observation object side lens surface is concave; and
    a third lens which has positive refractive power and of which an eye point side lens surface is convex,
    at least one lens surface, out of lens surfaces constituting the first lens, the second lens and the third lens, being aspherical, and
    the following conditional expressions being satisfied:

$$0.40 < f3/f1 < 2.50 \quad (5)$$

$$1.40 < (R12+R11)/(R12-R11) < -0.75 \quad (6A)$$

$$1.35 < (R22+R21)/(R22-R21) < 2.40 \quad (7)$$

where f1 denotes a focal length of the first lens, f3 denotes a focal length of the third lens, R11 denotes a radius of curvature of an observation object side lens surface of the first lens, R12 denotes a radius of curvature of an eye point side lens surface of the first lens, R21 denotes a radius of curvature of the observation object side lens surface of the second lens, and R22 denotes a radius of curvature of an eye point side lens surface of the second lens.

15. The eyepiece optical system according to claim 14, wherein the following conditional expression is satisfied:

$$1.60 < fe/(-f2) < 2.20$$

where fe denotes a focal length of the eyepiece optical system, and f2 denotes a focal length of the second lens.

16. The eyepiece optical system according to claim 14, wherein the following conditional expression is satisfied:

$$0.60 < fe/f1 < 2.00$$

where fe denotes a focal length of the eyepiece optical system.

17. An optical apparatus comprising:
    an objective lens;
    a picture element that captures an image formed by the objective lens;
    an image display element that displays the image captured by the picture element; and
    an eyepiece optical system for observing the image displayed on the image display element,
    the eyepiece optical system being the eyepiece optical system according to claim 14.

18. A method for manufacturing an eyepiece optical system including, in order from an observation object side:
- a first lens having positive refractive power;
- a second lens which has negative refractive power and of which an observation object side lens surface is concave; and
- a third lens which has positive refractive power and of which an eye point side lens surface is convex, the third lens being fixed on an optical axis with respect to the observation object when adjusting a diopter, the method comprising:

disposing each lens in a lens barrel so as to satisfy the following conditional expressions:

$$0.65 < R31/fe < 1.30 \quad (1)$$

$$-0.80 < (R32+R31)/(R32-R31) < -0.10 \quad (2)$$

$$1.00 < fe/f3 < 1.60 \quad (3A)$$

where fe denotes a focal length of the eyepiece optical system, R31 denotes a radius of curvature of an observation object side lens surface of the third lens, R32 denotes a radius of curvature of the eye point side lens surface of the third lens, and f3 denotes a focal length of the third lens.

19. A method for manufacturing an eyepiece optical system including in order from an observation object side along an optical axis:

a first lens having positive refractive power;
a second lens which has negative refractive power and of which an observation object side lens surface is concave; and
a third lens which has positive refractive power and of which an eye point side lens surface is convex,
at least one lens surface, out of lens surfaces constituting the first lens, the second lens and the third lens, being aspherical, the method comprising:

disposing each lens in a lens barrel so as to satisfy the following conditional expression:

$$0.40 < f3/f1 < 2.50 \quad (5)$$

$$1.40 < (R12+R11)/(R12-R11) < -0.75 \quad (6A)$$

$$1.35 < (R22+R21)/(R22-R21) < 2.40 \quad (7)$$

where f1 denotes a focal length of the first lens, f3 denotes a focal length of the third lens, R11 denotes a radius of curvature of an observation object side lens surface of the first lens, R12 denotes a radius of curvature of an eye point side lens surface of the first lens, R21 denotes a radius of curvature of the observation object side lens surface of the second lens, and R22 denotes a radius of curvature of an eye point side lens surface of the second lens.

* * * * *